United States Patent [19]

Kinoshita et al.

[11] Patent Number: 4,466,055

[45] Date of Patent: Aug. 14, 1984

[54] INFORMATION PROCESSING SYSTEM INCLUDING A ONE-CHIP ARITHMETIC CONTROL UNIT

[75] Inventors: Tsuneo Kinoshita; Fumitaka Sato, both of Tokyo; Isamu Yamazaki, Kawasaki, all of Japan

[73] Assignee: Tokyo Shibaura Denki Kabushiki Kaisha, Kawasaki, Japan

[21] Appl. No.: 244,623

[22] Filed: Mar. 17, 1981

[30] Foreign Application Priority Data

| Mar. 19, 1980 [JP] | Japan | 55-35499 |
| Mar. 19, 1980 [JP] | Japan | 55-35501 |
| Mar. 19, 1980 [JP] | Japan | 55-35502 |

[51] Int. Cl.³ .................. G06F 3/00; G06F 13/00
[52] U.S. Cl. .................................................. 364/200
[58] Field of Search ... 364/200 MS File, 900 MS File

[56] References Cited

U.S. PATENT DOCUMENTS

| Re. 30,671 | 7/1981 | Poland | 364/200 X |
| 4,035,777 | 7/1977 | Moreton | 364/200 |
| 4,050,058 | 9/1977 | Garlic | 364/200 |
| 4,085,448 | 4/1978 | Kogge | 364/900 |
| 4,087,854 | 5/1978 | Kinoshita | 364/200 |
| 4,152,762 | 5/1979 | Bird et al. | 364/200 |
| 4,217,638 | 8/1980 | Namimoto | 364/200 |
| 4,250,547 | 2/1981 | Matsumoto | 364/200 |
| 4,268,901 | 5/1981 | Subrizi | 364/200 |
| 4,270,184 | 5/1981 | Shimokawa | 364/900 |
| 4,271,466 | 6/1981 | Yamamoto | 364/200 |
| 4,287,563 | 9/1981 | Huston, Jr. | 364/200 |
| 4,315,308 | 2/1982 | Jackson | 364/200 |
| 4,317,171 | 2/1982 | Maejima | 364/200 |
| 4,337,510 | 6/1982 | Maezumi | 364/200 |

FOREIGN PATENT DOCUMENTS

| 0036093 | 9/1981 | European Pat. Off. . |
| 7635899 | 11/1976 | France . |
| 1330515 | 9/1973 | United Kingdom . |

OTHER PUBLICATIONS

IBM Technical Disclosure Bulletin, vol. 21, No. 9, Feb. 1979, New York Rivero: "Multiple Master Simultaneous Use of a Common Bus by Space Separation", pp. 3621–3622.

Electronics, vol. 53, No. 22, Oct. 1980, New York, Cohen: "The Power is With a new 16-bit SOS Microprocessor", pp. 75–76.

Microprocessors & Microsystems, vol. 3, No. 10, Dec. 1979, Whitworth: "Designing Flexibility into Memory Systems", pp. 435–441.

IBM Technical Disclosure Bulletin, vol. 20, No. 2, Jul. 1977, Kerrigan et al.: "Sequence-Distributed ROS Control", p. 621.

IBM Technical Disclosure Bulletin, vol. 20, No. 9, Feb. 1978, Holtz et al.: "Control Store Exception Array", pp. 3610–3611.

Electronics, vol. 47, No. 8, Apr. 1974 Shima: "In Switch to n-MOS Microprocessor gets a 2-uS Cycle Time", pp. 95–100.

Primary Examiner—Harvey E. Springborn
Attorney, Agent, or Firm—Kenyon & Kenyon

[57] ABSTRACT

In an information processing system in which an arithmetic control unit is formed on one chip by very large scale integration and is connected to external devices by a common bus, microinstructions from an externally-connected control memory, memory information output from an external main memory and information output from I/O devices, can be received by the arithmetic control unit on the common bus. An external setting signal for selecting whether the instruction system of the arithmetic control unit is to be enabled or disabled is input to the arithmetic control unit on the common bus simultaneously with the fetching of a microinstruction. A bus width setting signal from an I/O device is also input to the arithmetic control unit on the common bus simultaneously with the fetching of a microinstruction, and the CPU determines whether the data width of an I/O device is 8 bits or 16 bits. An interruption signal from an I/O device and a signal indicating an abnormal condition of a power source, for example, may be input to the arithmetic control unit from external devices on the common bus as part of a group of external signals occupying only a portion of the common bus simultaneously with the fetching of a microinstruction on the remaining portion of the common bus. When exchanging a plurality of kinds of data with different phases between the arithmetic control unit and external devices on the common bus, an external status signal unique to each phase is input to the arithmetic control unit on a common signal line in synchronism with each phase.

13 Claims, 7 Drawing Figures

FIG. 3
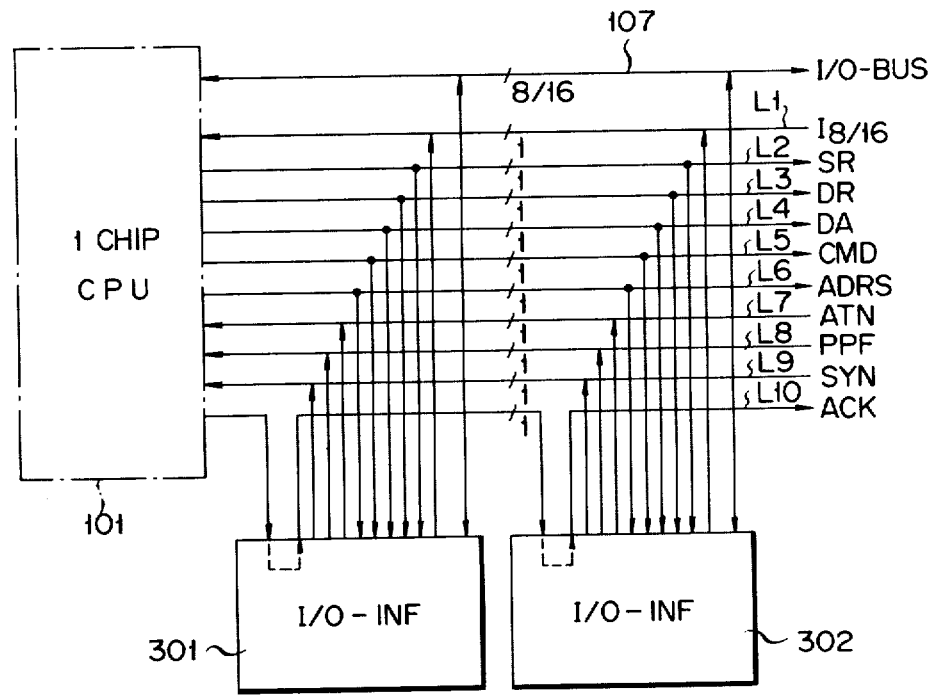
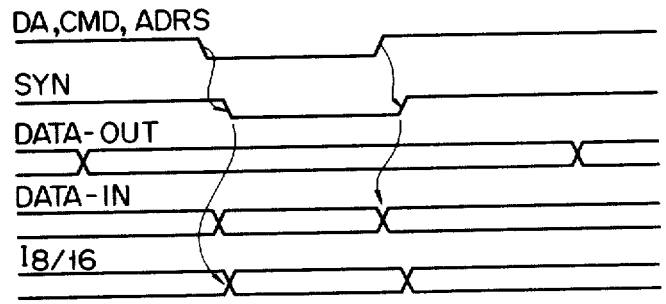
FIG. 4A
FIG. 4B
FIG. 4C
FIG. 4D
FIG. 4E

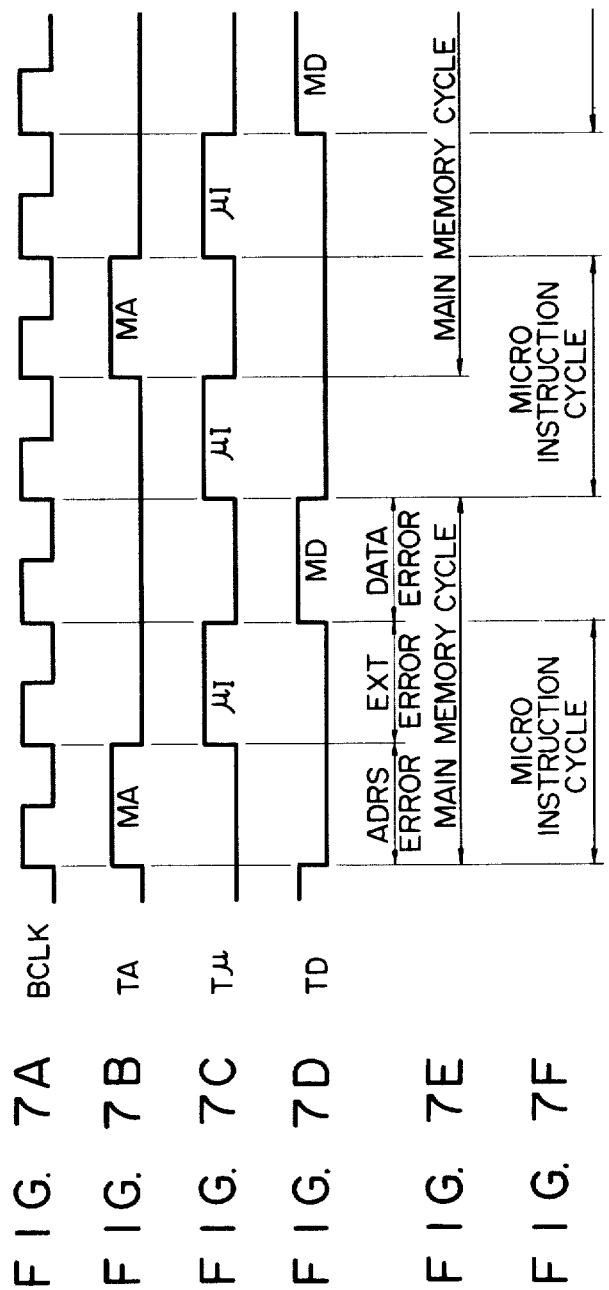

INFORMATION PROCESSING SYSTEM INCLUDING A ONE-CHIP ARITHMETIC CONTROL UNIT

BACKGROUND OF THE INVENTION

The present invention relates to an information processing system which includes an arithmetic control unit fabricated on a single chip using very large scale integration.

With the recent developments in semiconductor techniques, the arithmetic control unit, which is the main component of an information processing system, can now be formed on a single chip by very large scale integration (sometimes referred to as VLSI for brevity hereinafter). When the arithmetic control unit is formed by VLSI, the performance of the unit may be improved, the unit may be made more compact, and the performance to price ratio may be improved. However, there are also limits on the number of pins the single chip package can accommodate as well as limits on power consumption, capacity and performance. VSLI application techniques require further development to solve these problems. One of the problems to be solved by such techniques may be summarized as follows. Input/output devices (sometimes referred to as I/O for brevity hereinafter) connected to the arithmetic control unit through input/output buses generally employ a data transfer width of 8 bits (1 byte). However, an I/O has recently been developed which employs a data transfer width of 16 bits for performing data transfer at a higher speed. Thus, the one-chip arithmetic control unit described above must be of a construction which permits smooth data transfer between these two different kinds of I/Os.

There is another problem. The one-chip arithmetic control unit utilized in the present invention is so constructed that control is performed by microprograms, and a memory for storing these microprograms (sometimes referred to as a ROM hereinafter) is externally connected to the chip due to limits imposed by the chip. Although it is possible to freely write into the externally-connected ROM, there are limits imposed on the selection of the ROM addresses. For example, when the operation code (OP code) of a user instruction is of 8-bit construction, up to $2^8 = 256$ instructions may be prepared. In correspondence with these OP codes of 8 bits, microinstructions are stored in the 0 to 255 addresses of the externally-connected ROM. The microinstructions and the user instructions are different in bit construction and content. Accordingly, with an instruction of a complex function such as a floating instruction, it becomes impossible to translate one user instruction with only one microinstruction. In such a case, it becomes necessary to store an additional microinstruction necessary for translating a single user instruction in a certain address region of the ROM so that this address may be automatically selected. Further, it is not necessary to use all of the $2^8 = 256$ instructions; only some of them are usually used. Thus, when an OP code with no corresponding user instruction is designated by mistake (e.g., when the program overruns), it is necessary to detect that this OP code is an illegal instruction by the microinstruction processing portion of the system. One of the technical problems resulting from an arithmetic control unit formed on one chip is to find out how to perform these controls with satisfactory efficiency. In addition to this, it is desired not to fix the correspondence between the microprograms and the OP codes, but to vary the correspondence as required, so that the overall system can perform with an instruction system different from the original instruction system.

As logic functions within a chip increase, the number of connections for exterior signals increases. However, the number of external connection pins which may be formed on the package of the one-chip arithmetic control unit are limited. Another problem associated with the arithmetic control unit is, therefore, how to use this limited number of external connection pins to obtain more functions within the chip.

OBJECTS AND SUMMARY OF THE INVENTION

It is, therefore, an object of the present invention to provide an information processing system which includes a one-chip arithmetic control unit to which a control memory is externally-connected, wherein input of microinstructions arithmetic control unit from said control memory and reception of the main memory information or input/output information from the external main memory and I/O devices are all performed using a single common bus, thereby greatly reducing the number of external connection pins required of said arithmetic control unit.

Another object of the present invention is to provide an information processing system which includes a one-chip arithmetic control unit of VLSI construction wherein the arithmetic control unit is capable of performing transfer of input and output information with a plurality of I/Os of different data transfer widths so that switching of different data transfer widths, and input/output control may be effectively performed with the limited number external connection pins available on the arithmetic control unit.

It is another object of the present invention to provide a one-chip arithmetic control unit of VLSI construction wherein decoding of the user instruction and the fetching of the microinstruction are performed at the same time to improve data transfer, and any desired instruction system other than the original instruction system of the information processing system may be adopted as required while still employing the logic elements within the chip.

It is still another object of the present invention to provide an information processing system having a one-chip arithmetic control unit of VLSI construction in which external exchange of data with different phases is multiplexed on a main bus and a plurality of external status signals generated upon exchange of respective data may be input to the arithmetic control unit with an extremely small number of external connection pins.

In order to attain the above-mentioned objects there is provided an information processing system comprising:

an arithmetic control unit fabricated on one chip by very large scale integration;

a control memory external to the arithmetic control unit in which can be stored a plurality of microprograms each comprising a plurality of microinstructions for controlling the arithmetic control unit;

a memory bus external to the arithmetic control unit adapted to be coupled to a main memory external to the arithmetic control unit;

an input/output bus external to the arithmetic control unit adapted to be coupled to at least one input/output device;

a common bus coupled to the arithmetic control unit, the control memory, the memory bus and the input/output bus for transferring information between the arithmetic control unit and the control memory, between the arithmetic control unit and the memory bus and between the arithmetic control unit and the input/output bus;

first means for separating the common bus exteriorly of the arithmetic control unit into a first bus portion to which are coupled the arithmetic control unit and the control memory and a second bus portion to which are coupled the memory bus and the input/output bus;

the arithmetic control unit including means coupled to the first means for causing the first means to selectively either couple the first and second bus portions or to separate the common bus into the first and second bus portions, said means of the arithmetic control unit causing the first means to separate the common bus into the first and second bus portions when microinstructions are to be read from the control memory to the arithmetic control unit, the arithmetic control unit being coupled to the control memory and supplying microinstruction addresses thereto in response to which microinstructions are read out of the control memory onto the first bus portion of the common bus when the first means is caused to separate the common bus into the first and second bus portions.

The present invention utilizes an arithmetic control unit formed on a single chip by very large scale integration and an externally-connected control memory wherein input of microinstructions from said control memory, output of the memory address and input/output of data between the external main memory and the I/O devices, and data input/output bus are performed on a single common bus, thereby reducing the number of external connection pins required of said arithmetic control unit.

The present invention provides an information processing system including a one-chip arithmetic control unit of VLSI construction wherein the arithmetic control unit is capable of constantly smoothly performing the transfer of input and output data between a plurality of I/Os of different data widths so that switching of the data transfer width and input/output control may be efficiently performed with a limited number of external connection pins of the arithmetic control unit.

The present invention further provides a one-chip arithmetic control unit of VLSI construction wherein decoding of the user instruction and fetching of the microinstruction are performed at the same time to improve data transfer, and any desired instruction system other than the original instruction system of the information processing system may be adopted as required while still employing the logic elements within the chip.

The present invention further provides an information processing system having a one-chip arithmetic control unit of VLSI construction in which external exchange of data with different phases is multiplexed on a main bus and a plurality of external status signals generated upon exchange of respective data may be input to the arithmetic control unit with an extremly small number of external connection pins so that more logic functions may be incorporated within the chip while efficiently utilizing the limited number of external connection pins available.

BRIEF DESCRIPTION OF THE DRAWINGS

This invention can be more fully understood from the following detailed description when taken in conjunction with the accompanying drawings, in which:

FIG. 3 is a block diagram showing the connections between the arithmetic control unit shown in FIG. 2 and I/Os;

FIGS. 4A through 4E are timing diagrams for input/output control signals, wherein FIG. 4A shows the output timing of a DA (Data Available) signal, a CMD (Command) signal, and an ADRS (Address) signal; FIG. 4B shows the input timing of a SYN (Synchronous) signal indicating a response signal from an external unit; FIG. 4C shows the output timing of a DATA-OUT signal for outputting data from the C-BUS to the I/O-BUS; FIG. 4D shows the input timing of a DATA-IN signal for outputting data from the I/O-BUS to the C-BUS; and FIG. 4E shows the input timing of a bus width setting signal I 8/16 for data transfer between the arithmetic control unit and an I/O;

FIGS. 7A through 7F are timing diagrams showing timing for the transfer of respective data on the C-BUS, during the main memory cycle and the microinstruction cycle in the embodiment shown in FIG. 6, wherein FIG. 7A shows the basic clock signal; FIG. 7B shows the transfer cycle (TA) of the memory address MA; FIG. 7C shows the transfer cycle (T$\mu$. of the microinstruction $\mu$I; FIG. 7D shows the transfer cycle (TD) of the memory data MD; FIG. 7E shows the main memory cycle and FIG. 7F shows the microinstruction cycle.

DESCRIPTION OF THE PREFERRED EMBODIMENTS

Figure 1:
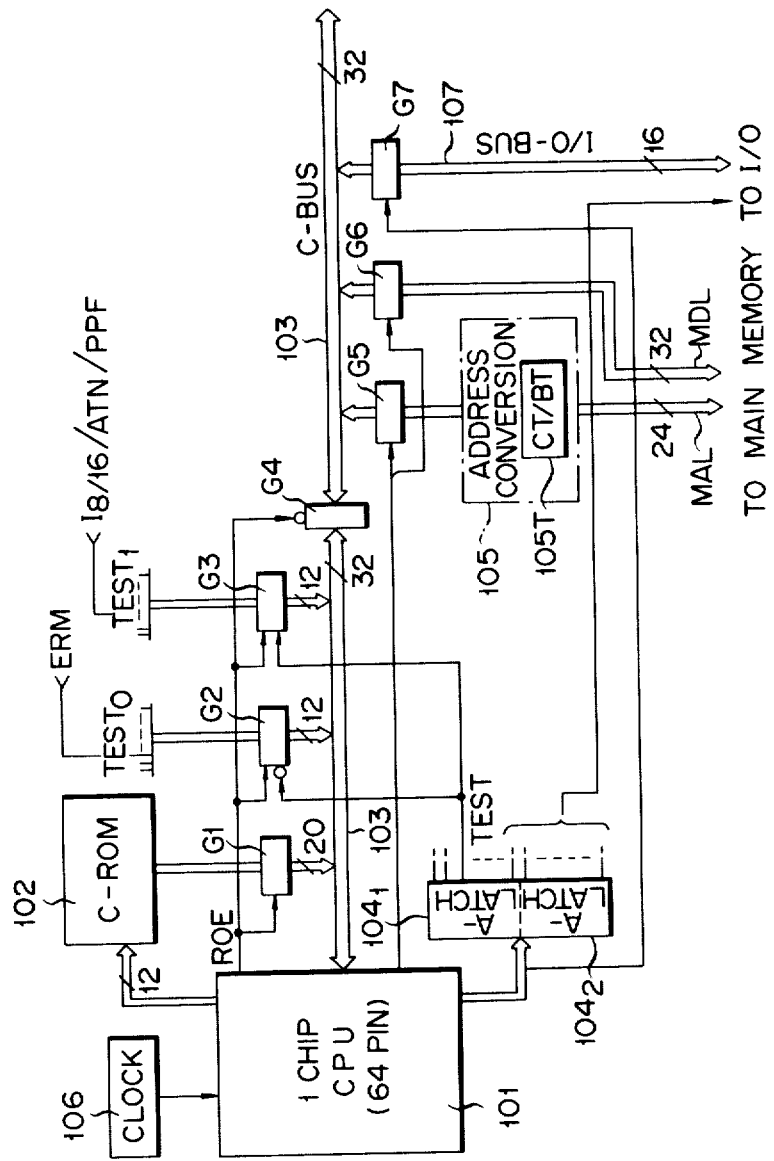
FIG. 1 is a block diagram showing the basic construction of information processing system which includes a one-chip arithmetic control unit according to the present invention.

The present invention will now be described by way of example, referring to the accompanying drawings. FIG. 1 is a block diagram illustrating the basic construction of an information processing-system incorporating a one-chip arithmetic control unit in accordance with the present invention. Referring to FIG. 1, reference numeral 101 denotes a one-chip arithmetic control unit (sometimes referred to as one-chip CPU hereinafter) formed on one chip by very large scale integration (VLSI). The number of external connection pins formed on the one-chip CPU package is 64. Reference numeral 102 denotes an externally attached control memory (sometimes referred to as a C-ROM hereinafter) for storing microprograms each comprising a plurality of microinstructions for controlling the one-chip CPU 101. Reference numeral 103 denotes a common bus (sometimes referred to as a C-BUS hereinafter) as a common data transmission line between the one-chip CPU 101 and external units. This common bus 103 is construction of 32-bit width, and on it pass multiplexed output data (microinstructions) of the C-ROM 102, memory addresses, memory data, I/O (input/output) data, etc. Reference numerals 104₁ and 104₂ denote addressable latch circuits which are externally connected to the one-chip CPU 11 and decode control signals from the one-chip CPU. These addressable latch circuits 104₁, 104₂ output a plurality of external control signals decoded from the control signals output from the one-chip CPU 101. Among these, the addressable latch circuit 104₂ outputs 8.a control signals for the I/Os which will be described in more detail hereinafter. Reference numeral 105 denotes an address conversion mechanism for enlarging the address space of the main ROM and for obtaining a physical address of the main ROM, referring to a conversion table 105T, based on a logic address, segment information and so on output from the one-chip CPU 101 on the C-BUS 103. This address conversion mechanism 105 takes one of two different functional constructions according to two external setting signals (BTMD, CTMD) included in the external signal group (TEST O) which designate a particular address conversion system. One system is address conversion by base modification and the other is that by page modification. The conversion table 105T, which is the main part of the address conversion mechanism 105, assumes different functional constructions (dividing method of the registers) for address conversion by the base modification and for address conversion by page modification. The table used for base modification will be referred to as a BT (Base address Table) and the table used for the page modification will be referred to as a CT (Cnversion Table). Reference numeral 106 denotes a clock pulse generator for generating basic clock pulses of the one-chip CPU 101. Reference numeral 107 denotes an input/output bus (sometimes referred as I/O-BUS hereinafter) for transferring data between the one-chip CPU 101 and the input/output devices (sometimes referred to as I/Os hereinafter). The I/O BUS has a 16-bit width and may be used for data transfer with the one-chip CPU 101 in widths of 8-bit or 16-bit depending upon the data transfer width of the I/O. G1 to G7 are gate circuits for controlling data transfer on the C-BUS 103. When the gate circuit G1 is enabled by the control signal (ROE) from the one-chip CPU 101 and the microinstruction (20 bits) read out from the C-ROM 102 is received by the 1-chip CPU 101 on C-BUS 103, the gate circuit G4 is disabled and the C-BUS 103 is separated by the gate circuit G4. One of the gate circuits G2 and G3 is also selectively enabled when the gate circuit G1 is enabled. In initializing mode, upon enabling of the gate circuit G2, a group of external signals (12 bits) of TEST O are simultaneously input to the 1-chip CPU 101 on the C-BUS 103 together with the microinstructions from the C-ROM 102. During running of the microprograms, upon enabling of the gate circuit G3, a group of external signals (12 bits) denoted TEST 1 is simultaneously input to the 1-chip CPU 101 together with the microinstructions from the C-RO 102. An external setting signal "ER" is also input as one of a group of external signals denoted TEST 0 to the 1-chip CPU 101 together with the microinstructions.

The I 8/16, ATN, and PPF external input signals are also included in the TEST 1 group of external signals. These signals will be described in more detail hereinafter. Except during a read cycle of the microprograms and a main access by a DMA (Direct Memory Access) unit. (not shown), the gate circuit G4 is continually enabled, and the gate circuits G5, G6 and G7 are selectively enabled. Thus, data transfer among the 1-chip CPU 101, the address conversion mechanism 105, the main memory, and other I/O devices is performed on the C-BUS 103 and the various buses selectively connected to the C-BUS 103. MAL denotes a memory address line and MDL denotes a memory data line, both included as part of the memory bus.

CPU INTERNAL ARCHITECTURE

Figure 2A:
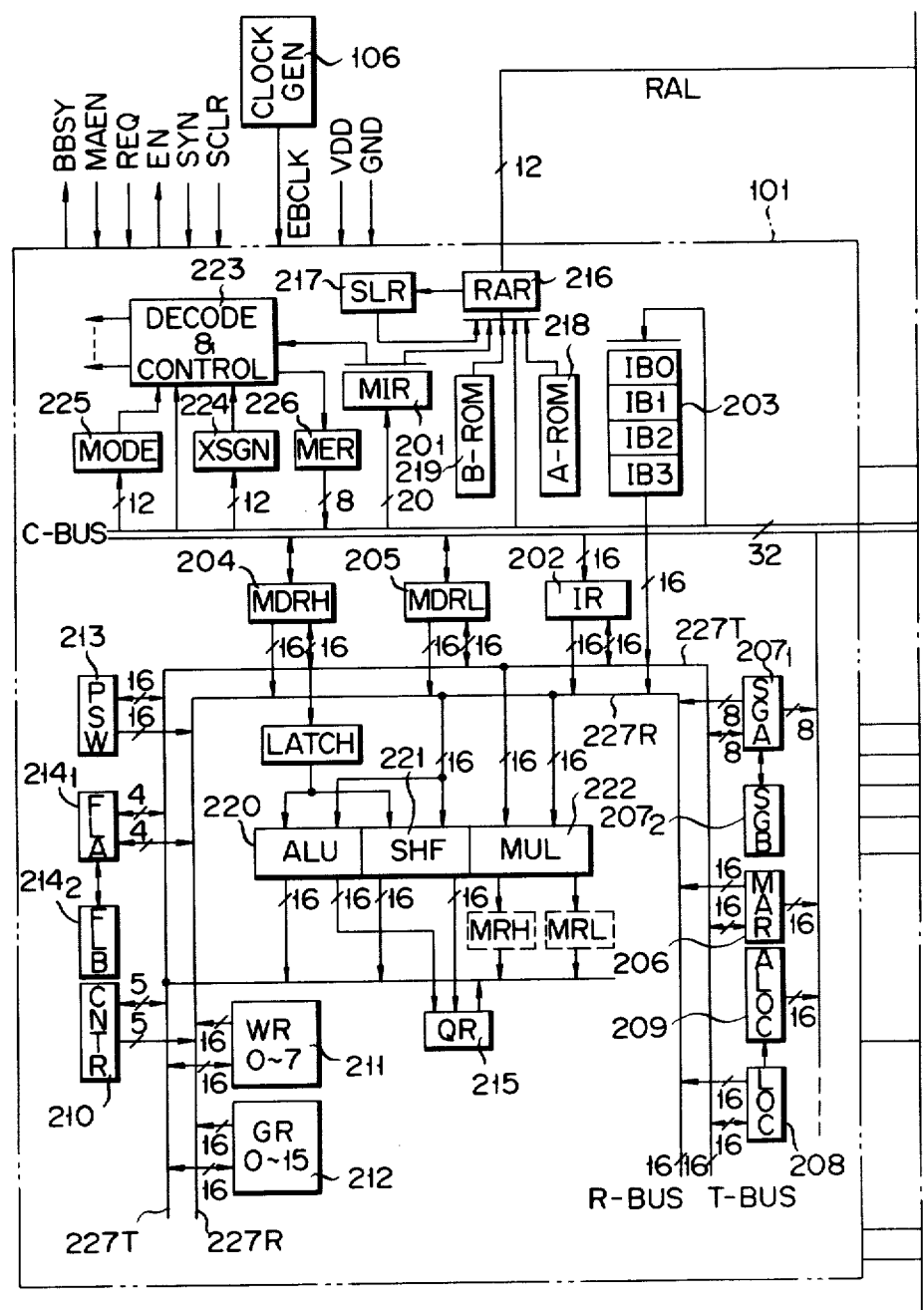
FIG. 2 which is made up of FIGS. 2A and 2B is a detailed block diagram of the arithmetic control unit shown in FIG. 1.
Figure 2B:
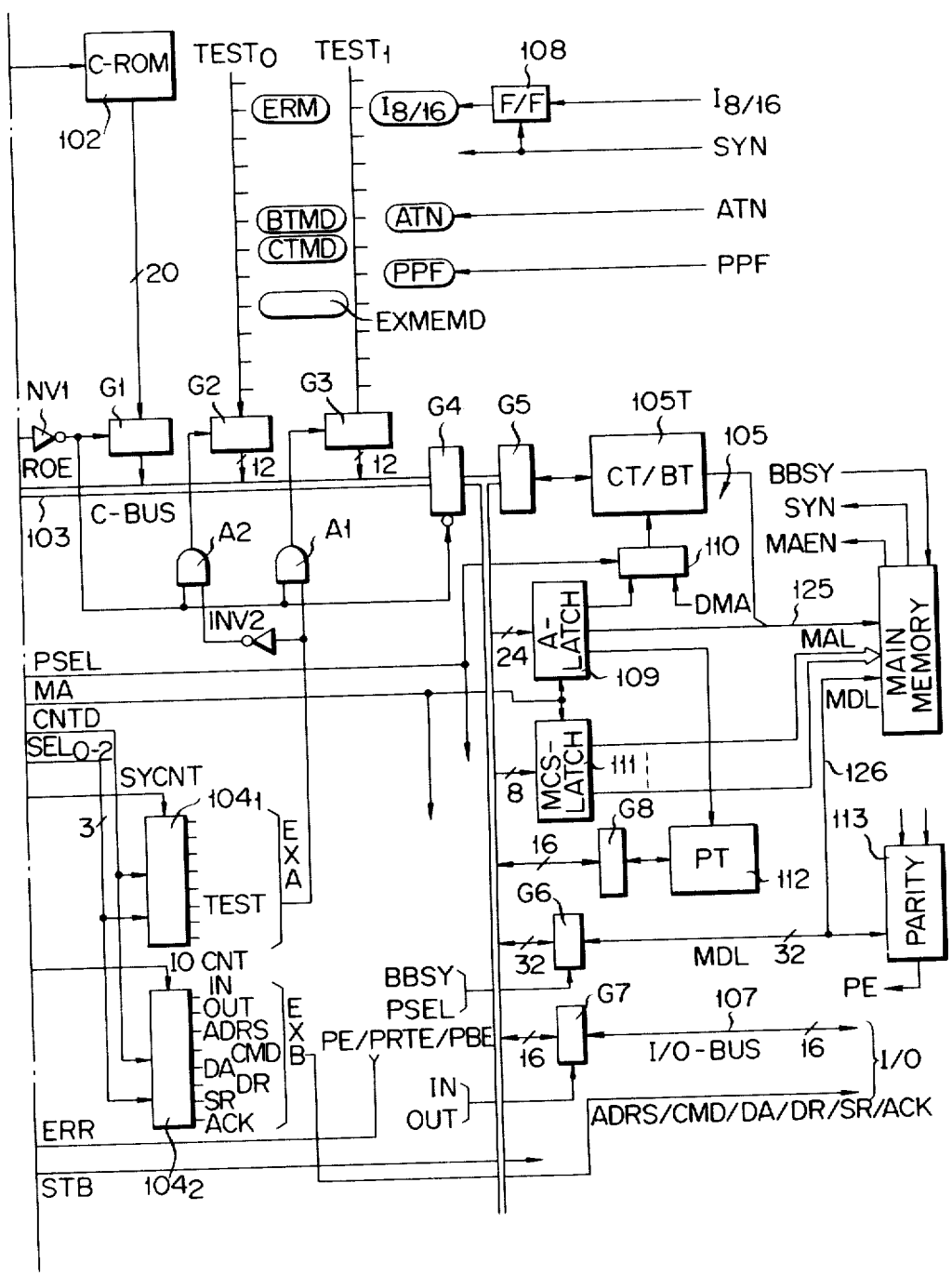

FIG. 2, constitued by FIGS. 2A and 2B, is a diagram block illustrating the construction of the information processing system of FIG. 1 in more detail. The 1-chip CPU 101 is connected to external circuits by a total of 64 pins including 32 pins for connection to the 32 bit wide C-BUS. The chip includes the following logic elements (denoted by the "200" series of references numerals):

(1) MIR (Micro Instructions Register) . . . 201: 20 bits

This register stores microinstructions read out from the C-ROM 102 on the C-BUS 103.

(2) IR (Instruction Register) . . . 202: 16 bits

This register stores the user instruction which is currently being executed. The user instruction is transferred to the IR register from Instruction Buffer registers IB0 to IB3 which store the next user instruction to be executed.

(3) IB0 to IB3 (Instruction Buffer) . . . 203: 16 bits×4

This register is used in fetching of user instructions to store the fetched user instruction. When execution of the user instruction store in the IR 202 is completed, the next user instruction is transferred from the IB0 to IB3 to the IR 202. Although it is possible to read out the contents of the instruction buffers IB0 203 to IB3 203 to internal buses T-BUS 227T and R-BUS 227R by a microinstruction, it is impossible to write into the instruction buffers from T-BUS 227T or from a R-BUS 227 R. Writing of the user instruction into IB0 203 to IB3 203 is performed on the C-BUS 103.

(4) MDRH (Memory Data Register High) . . . 204: 16 bits

This register is capable of receiving data from the C-BUS 103. This register is capable of receiving data from the C-BUS 103 and of supplying data to the C-BUS 103. This register is further capable of supplying data to the R-BUS 227R and the T-BUS 227T and receiving data from the T-BUS 227T.

(5) MDRL (Memory Data Register Low) . . . 205: 16 bits

This register holds the 16 lower order bits of the 32 bit data on the C-BUS 103, and of supplying data to the C-BUS 103. This register is capable of receiving data from the C-BUS 103. This register is further capable of supplying data to the R-BUS 227R and the T-BUS 227T and of receiving data from the T-BUS 227T.

(6) MAR (Memory Address Register) . . . 206: 16 bits

The memory address information is 24 bits wide, 16 bits of which are the logic address of the main memory and 8 bits of which are the segment information. The MaR 206 stores the 16 bit main memory logic address, and the segment register A (SGA) 207, stores the 8 bit segment information. The MAR 206 and the SGA 207, together ouput 24 bit address information to the C-BUS 103. Since the C-BUS 103 is multiplexed as described, and address latch circuit (ALATCH) is disposed externally of the chip for latching the 24 bit address information therein. The MAR 206 functions to count in units of "2" or "4".

(7) SGA, SGB (Segment Register A, B) . . . 207 8 bits×2, 207₂:

This register enlarges the logic address space and stores information designating the segment of the external conversion table 105T to be used. The contents of this register together with the contents of the MAR 206 form the source for generating a physical address. SGA 207, is normally used, and SGB 207₂ is temporarily used for particular instructions.

(8) LOC(Locaton Counter) . . . 208: 16 bits

This counter stores the user instruction address, and is incremented by 2 after each fetching operation of the user instruction to designate and store the next user instruction address.

(9) ALOC (Advanced Location Counter . . . 209: 16 bits

This counter stores the address of the user instruction to be read out next from the main ROM. This counter is advanced by 2 or 4 bytes from the address stored by the LOC 208 for controlling the fetching operation.

(10) CNTR (Counter Register) . . . 210: 8 bits

This is a binary subtracting counter and is used for loop count, multiplication, division, shifting and so on of the microprograms.

(11) WR0 to WR7 (Working Register) . . . 211: 16 bits×8

This register stores temporary result of a microporgram operation. This register may be directly designated as a source or destination register by a microinstruction.

(12) GR0 to GR15 (General Register) . . . 212: 16 bits×16

This is a general-purpose register and may be accessed by user instruction. It is used as an accumulator, index register and so on.

(13) PSW (Program Status Word) . . . 213: 16 bits

This is a register for storing the internal status of the CPU; it holds various internal statuses such as an interrupting mask, the internal status of an operation result, a memory address mode, a master/slave mode and so on.

(14) FLA, FLB (Flag Register A,B) . . . 214₁, 214₂ 4 bits×2

This stores the status of an arithmetic/logic operation.

(15) QR (Quotient Register) . . . 215: 16 bits

This register is used as an additional register for the Arithmetic and Logic Unit to (ALU) 220 for arithmetic logic operations, and for Shifter (SHF) 221 for high speed shifting.

(16) RAR (ROM Address Register) . . . 216: 12 bits

This register holds the address of the microinstruction to be read out next. The address stored in this RAR 216 is supplied to the C-ROM 102 on a 12 bit wide ROM address line (RAL). RAR 216 performs a counting function and counts in unitary increments every time a micro-instruction is read out.

(17) SLR (Subroutine Link Register) . . . 217: 12 bits

This register stores the return address of a microinstruction during execution of a subroutine branch.

(18) A-ROM (Internal ROM A) . . . 218: 12 bits×2

This internal ROM stores the starting address of the microprogram after a system clear, and the starting address of the microprogram after an interruption has been detected.

(19) B-ROM (Internal ROM B) . . . 219: 12 bits×256

This internal ROM forms a correspondence table between a microinstruction an OP code of a user instruction, and has addresses corresponding to he addresses (0 to 225) of the C-ROM 102 capable of being designated by the 8 bit OP code of the IR 202. Each address of the B-ROM 219 stores information for determining whether the microinstruction corresponding to the OP code is to be terminated in one step, requires two steps or more, or is an illegal instruction. All "1"s indicate that the microinstruction is terminated in one step and "0"'s indicate an illegal instruction. The microinstruction address for the second step when the microinstruction requires two steps or more is stored in the B-ROM 219. When the microinstruction is to be terminated in one microstep, this microinstruction is stored in the addresses of the C-ROM 102 corresponding to the addresses of the B-ROM 219. When the microinstruction requires two microsteps or more, the microinstruction of the first step is stored in the C-ROM 102, and the C-ROM address in which is stored the microinstruction of the second step is stored in the B-ROM 219. In the case of an illegal instruction, the starting address of the microprogram for processing an error corresponding to the illegal instruction is stored in the C-ROM 102.

(20) ALU (Arithmetic and Logic Unit) . . . 220

This logic circuit of 16-bit binary parallel architecture performs arithmetic and logic operations and includes a 1-bit decimal adding/subtracting circuit. Operation data from the R-BUS 227R is directly input to the ALU 220. Operation data from the T-BUS 227T is latched in the latch circuit (LATCH) and is thereafter input to the ALU 220. An operation result is output to the T-BUS 227T.

(21) SHF (Shifter) . . . 221

This shifter circuit performs left shift or right shift of 1 to 15 bits in 1 cycle. The four lower order bits on the R-BUS 227R designate the number of shifts. The shift number designation on the R-BUS 227R is directly input to the SHR 221. The data from the T-BUS 227T is input to the SHF 221 through the latch circuit (LATCH). The shift result is output to the T-BUS 227T.

(22) MUL (Multiplier) . . . 222

This is a high-speed multiplier of 16×16 bits to which is input data from the T-BUS 227T and R-BUS 227R. The most significant bit of an expanded operation result is supplied to the register MRH, and the least significant bit thereof is supplied to the register MAL. Equivalents of the MRH and MRL are assembled within the MUL. The MRH and MRL are imaginary registers and do not physically exist.

(23) DECODE & CONT (Decoder and Controller) . . . 223

This decoder and controller decodes microinstructions stored in the MIR 201 and outputs various control signals. Predetermined signals other than the output of the MIR 201 are input to the DECODE & CONT 223, and are decoded and output as control signals.

(24) XSGN (External Signal Register) . . . 224: 12 bits

This register stores the TEST 1 group of external signals (12 bits) which are input on the C-BUS 103 together with the microinstruction read out from the C-ROM 102. The contents of te XSGN 224 are supplied to the DECODE & CONT 223.

(25) MODE (Mode Register) . . . 225: 12 bits

This register stores the TEST 0 group of external signals (12 bits) input on the C-BUS 103 during the initializing mode. The contents of the MODE 225 are supplied to the DECODE & CONT 223.

(26) MER (Memory Control Register) . . . 226: 8 bits

This register stores memory control information (8 bits) supplied from the DECODE & CONT 223. The contents of the MER 226 are output from the CPU on the C-BUS 103 simultaneously with the contents of the MAR 206 and the SGA $207_1$ (or the SGB $207_2$).

(27) T-BUS, R-BUS (Transfer Bus, Receiver Bus) . . . 227T, 227R

The T-BUS 227T is an internal bus capable of duplex data transfer, and the R-BUS 227R is an internal bus capable of simplex data tranfer. Both are of 16-bit width and are used mainly for data transfer between the registers inside the 1-chip CPU 101.

CPU INPUT/OUTPUT SIGNALS

External signals input to and output from the 1-chip CPU 101, other than on the C-BUS 103 (32 bits) and the ROM address line RAL 912 bits), include the following:

(1) ROE (ROM Output Enable)

This is a timing signal output by the CPU for inputting a microinstruction into the CPU read out from the C-ROM 102 on the C-BUS 103. This signal is also used as a gate control signal for gate G4 for separating the C-BUS 103 into two portions, and as a timing signal for inputting to the CPU the TEST 0 or test 1 group of external signals on the C-BUS 103.

(2) PSEL (Processor Select)

This signal output by the CPU indicates that the 1-chip CPU 101 is using the memory bus.

(3) MA (Memory Address)

This signal output by the CPU indicates that the signal on the C-BUS 103 is a memory address of the main ROM. This signal enables the memory address to be latched in the latch circuit (LATCH).

(4) SYCNT (System Control)

This is a timing signal output by the CPU for latching (or unlatching) the control signal in an externally-connected addressable latch circuit 1041.

(5) IOCNT (I/O Control)

This is a timing signal output by the CPU for latching (or unlatching) the control signal in an externally-connected addressable latch circuit 1042.

(6) CNTD (Control Data)

This signal output by the CPU is for setting/resetting the addressable latch circuits 1041 and 1042. When this signal is a logic "1", the flip-flop selected by the decoded value of select signals SEL0 to SEL2, from among the flip-flops 0 to 7 inside the latch circuits 1041 and 1042, is set by the corresponding control signal SYCNT or IOCNT). The selected flip-flop is reset when the CNTD signal is a logic "0".

(7) SEL0, SEL1, SEL2 (Select)

These are 3-bit selection signals output by the CPU for selecting one of the light flip-flops in each of the addressable latch circuits 1041 and 1042, or as decoder input signals.

(8) SYN (Synchronous)

This is a response signal input to the CPU from and I/O (input/output device) which confirms the presence of the external device.

(9) REQ (Request)

This signal is input to the CPU when a DMA memory cycle is required.

(10) EN (Enable)

This is an enable signal output by the CPU when the REQ signal is received.

(11) BBSY (Bus Busy)

This is a memory control signal output by the CPU as a starting/terminating signal for accessing the main ROM.

(12) MAEN (Memory Access End)

This signal is input to the CPU when the main ROM has completed storing the data on the memory bus.

(13) ERR (Error)

This is an error detection signal and is input to the CPU when a PE (parity error), a PRTE (protect error), a PBE (converstion table non-defined error) or the like is generated.

(14) SCLR (System Clear)

This is a signal input to the CPU for initializing a predetermined internal register or the like.

(15) STB (Strobe)

This is a memory strobe signal output by the CPU from the clock pulse generator 106. The CPU internal clock pulses are generated based on this clock pulse by the DECODE & CONT circuit 223.

(17) VDD, GND

These are operating DC power source inputs to the CPU from an external power source (VDD= +5 V, GND=0 V).

EXTERNAL SYSTEM CONSTRUCTION

The construction and operation of components denoted by the "100" series of reference numerals externally connected to the 1-chip CPU 101 will be described next. The addressable latch circuit 1041 externally connected to the 1-chip CPU 101 outputs eight external control signals (EXA) based on the CNTD, SYCNT, and SEL0 to SEL2 signals. The other addressable latch circuit 1042 externally connected to the CPU outputs eight external control signals (EXB) for the I/Os based on the CNTD, IOCNT, SEL0 to SEL2 signals. The TEST signal output from the addressable latch circuit 1041 designates the group of external signals of TEST 0 or TEST 1 input to the 1-chip CPU 101 on the C-BUS 103 simultaneously with the microinstruction (20 bits) output from the C-ROM 102. When this signal is at logic "1", the TEST 0 group is selected. When a microinstruction is output from the C-ROM 102, the ROE signal is a logic "0". The ROE logic "0" signal is inverted by inverter INVI and supplied as a logic "1" to AND gate A1. The TEST signal is also supplied to the AND gate A1 whose output is connected to gate G3. When the ROE signal is a logic "0" and the TEST signal a logic "1", AND gate A1 is enabled which enables gate G3. As a result, the TEST 1 group of external signals (12 bits) is input to the 1-chip CPU 101 on the C-BUS 103 together with a microinstruction (20 bits) read out from the C-ROM 102. The TEST signal is inverted by inverter INVI and supplied to AND gate 2. The inverted ROE signal is also supplied to the AND gate 2. The output of the AND gate A2 is connected to the gate G2. When the ROE signal is at logic "0" and the TEST signal at logic "0", AND gate A2 is enabled which enables gate G2. As a result, the Test 0 group of external signals (12 bits) is input to the 1-chip CPU 101 on the C-BUS 103. The TEST signal is at logic "0" during initializing, and is at logic "1" during normal running of the microprograms. Therefore, during initializing, the TEST 0 group of external signals are input to the 1-chip CPU 101 in a microprogram read cycle. During normal running of a microprogram, the TEST 1 group of external signals is input to the 1-chip CPU 101 in a microprogram read cycle. The TEST 1 group of external signals input to the 1-chip CPU 101 is stored in the XSGN register 224, and the TEST 0 group of external signals insert is stored in the MODE register 225. An external setting signal ERM included in the TEST 0 group of external signals selects whether the instruction system of the information processing system is to be effective or ineffective. Since the OP code auxiliary table of the C-ROM 102 is set in advance in the B-ROM 219 disposed inside the 1-chip CPU 101 operation proceeds according to the rules described above. However, a user can use the information processing system with an instruction system which is different from the original instruction system, by freely changing the corresponding setting between the microprogram and the OP code. The external ERM setting signal is used for this purpose. When the ERM signal is at logic "0", setting of the B-ROM 219 becomes effective. When the ERM signal is at logic "1", setting becomes ineffective. This operation will be described in more detail hereinafter.

The TEST 1 external input signals which include and I 8/16, ATN and PPF are stored in the XSGN register 224. The I 8/16 signal is the bus width setting signal outputting an I/O device fo r performing data transfer with the 1-chip CPU 101. A logic "1" I 8/16 signal indicates that a 16-bit width is selected for data transfer. A logic "0" I 8/16 signal indicates that an 8-bit width is selected for data transfer. The I 8/16 signal supplied from the I/O device is temporarily latched in an external flip-flop 108 in synchronization with the SYN signal described above, and is thereafter input to the XSGN register 224 inside the 1-chip CPU 101 at the next program read timing for determining the I/O bus width selected. The ATN signal is an interruption signal output by and I/O device connected to the I/O-BUS 107. When a plurality of I/O devices are connected to the I/O-BUS 107, the interruption signals of the devices are "OR"ed and supplied as the TEST 1 ATN signal. The ATN signal output from an I/O device is cleared when an ACK signal (to be described hereinafter) supplied from the 1-chip CPU 101 via the latch circuit 1042 is received by the I/O which requested the interruption. The TEST 1 PPF signal is for signaling abnormalities in power from external devices including the I/Os.

EXTERNAL CONTROL SIGNALS FOR I/Os

The external control signals (EXB) for the I/Os, output from the addressable latch circuit 1042, include the following:

(1) IN (I/O Data Input)

This is a control signal for transferring data from the I/O-BUS 107 to the C-BUS 103.

(2) OUT (Destination I/O)

This is a control signal for transferring data from the C-BUS 103 to the I/O-BUS 107.

(3) ADRS (Address)

This is a control signal for signaling that the data on the I/O-BUS 107 is an I/O address.

(4) CMD (Command)

This is a control signal for signaling that the data on the I/O-BUS 107 is data to be transferred to an I/O.

(6) DR (Data Request)

This is a signal for requesting that data be placed on the I/O-BUS 107 by I/O.

(8) ACK (Acknowledge)

This is a response signal output when an interruption request from an I/O is received.

The above-mentioned eight external control signals (EXB) for the I/Os are output by the addressable latch circuit (A-LATCH) of 24-bit configuration for latching, based on the MA signal output from the 1-chip CPU 101, the 16 bit logical address stored in the MAR register 206 and the 8 bit segment information of 8 bits stored in the SGA register 2071 (or the SGB register 2072), both supplied from the 1-chip CPU 101 on the C-BUS 103. Reference numeral 110 denotes a selector for switching indexing information of the conversion table 105T, depending on the accessing time of the main ROM by the CPU and by a DMA unit. This selector selects the address information supplied by the address latch circuit 109 when the 1-chip CPU 101 accesses the main ROM, and selects the address information supplied by a DMA unit when the DMA unit accesses the main ROM. Reference numeral 111 denotes a memory control signal latch circuit (referred to as an MCS latch circuit hereinafter) for latching the 8 bit memory control information output on the C-BUS 103 by the MAR register 226n simultaneously with latching in the address latch circuit 109 of the 24 bit address information output on the C-BUS 103 by the MAR register 206 and the SGA register 207 (or the SGB register 2072), based on the MA signal output from the 1-chip CPU 101. Reference numeral 112 denotes a protection table (PT) constituting the memory protective mechanism; G8 denotes a gate circuit for reading/writing protection information in the protection table 112 on the C-BUS 103; and 113 denotes a parity circuit for generating a parity bit for the memory data and for parity checking.

CPU I/O CONNECTIONS

FIG. 3 shows in simplified form the connections between the 1-chip CPU 101 and a plurality of I/O devices, wherein reference numerals 301 and 302 denote input/output interface parts (I/O-INF) of the respective I/O devices, and L1 to L10 denote input/output control lines. The respective I/O control signals such as ADRS, CMD, DA, DR, SR, ACK and so on are output from the addressable latch circuit 1042 externally connected to the 1-chip CPU 101 as described above. The ACK signal (a response signal when an interruption signal is received) is supplied to the input/output interface parts 301 and 302 of the respective I/O devices by a daisy chain system. The transfer data from the respective I/O devices is transferred to the 1-chip CPU 101 using the full 16 bit width of the I/O-BUSes 107 or using the 8 lower order bits of the bus width signals (a logic "1" when the transfer width is 16 bits) of the respective I/O devices for signaling the I/O data transfer width are "OR"ed and output to one control line L1. This output signal is latched in flip-flop 108 in synchronism with the SYN signal and input to the 1-chip CPU 101 in the next microprogram read cycle.

FIGS. 4A through 4E show the timing of input/output control signals of the respective I/O devices. FIG. 4A shows the output timing of the DA signal and the ADRS signal. FIG. 4B shows the input timing of the SYN signal as a response signal from external devices including the I/O devices. FIG. 4C shows the output timing of the DATA-OUT signal for transferring the data on the C-BUS 103 to the I/O-BUS 107. FIG. 4D shows the output timing of the DATA-IN signal for transferring the data on the I/O-BUS to the C-BUS. FIG. 4E shows the input timing of the bus width setting signal I 8/16 for data transfer from the I/O devices.

C-BUS OPERATION

The operation of the C-BUS 103 will now be described. On the 32 bit wide C-BUS 103 are multiplexed as described, the output data of the C-ROM 102, that is, the microinstructions, the memory addresses of the main ROM, the memory data the I/O data and so on.

As shown in FIG. 7, except during data transfer with I/O devices, sequentially multiplexed on the C-BUS 103 in predetermined time widths (e.g., 200 ns) are a memory address, a microinstruction, memory data, a microinstruction, and a memory address. In the read cycle of the microinstruction, the gate circuit G1 is enabled by an ROE signal output from the 1-chip CPU 101. Then, the microinstruction (20 bits), read out from the C-ROM 102 by the designation of the microinstruction address or the OP code of the user instruction by the RAR register 216, is output to the C-BUS 103 through the gate circuit G1 and is received by the 1-chip CPU 101 on the C-BUS 103. Simultaneous with the transfer of microinstructions, of external signals TEST 0 or TEST 1 are input to the 1-chip CPU 101 on the C-BUS 103. During system initialization, the TEST 0 external signals are selected since the TEST signal output from the addressable latch circuit is a logic "0" and gate circuit G2 is enabled. The selected signals are input to the 1-chip CPU 101 together with the microinstruction from the C-ROM 102 on the C-BUS 103. During normal program execution, the TEST 1 external signals are selected since the TEST signal output is a logic "1" and gate circuit G3 is enabled. These groups of external signals are then input to the 1-chip CU 101 on the C-BUS 103 together with the microinstruction from the C-ROM 102. The 12 higher order bits of the C-BUS 103 together transfer the TEST 0 or TEST 1 external signals and the remaining 20 bits transfer a microinstruction. The microinstruction input to the 1-chip CPU 101 on the C-BUS 103 is stored in the MIR register 201. The TEST 0 external signals are stored in the MODE register 205, and the TEST 1 external signals are stored in the XSGN register 204.

When the ROE signal is output, gate circuit G4 is disabled, and the C-BUS 103 is separated into two portions, a first bus portion coupled to the CPU and a second bus portion coupled to a DMA. Thus, when the ROE signal is output, the C-BUS 103 is separated into a bus for internal processing between the 1-chip CPU 101 and the gate circuit G4, and a bus for controlling the DMA. During a main memory access by the 1-chip CPU 101, 24 bit memory address information consisting of the 16 bit main memory logic address stored in the MAR register 206 of the 1-chip CPU 101 and the 8 bit segment information for enlarging the logic address space stored in the SGA register 2071 (or SGB register 2072) is output from the 1-chip CPU on C-BUS 103 together with the 8-bit memory control information stored in the MAR register 226. During the transfer of memory address and control information, the ROE signal is not output but the MA signal is. Therefore, the 24 bit memory address (logic address) information is latched in the address latch circuit (A-LATCH) 107 from the C-BUS 103 through the enabled gate circuit G4, and the 8 bit memory control information is latched in the MCS latch circuit 109.

Part of the memory address information stored in the address latch circuit 107 is supplied to the address conversion table 105T through the selector 108. The physical address for a main memory access, consisting of information output by the indexing table and the address information stored in the address latch circuit 109, is supplied to the main memory on the memory address line MAL 125. An instruction word, operand data or the like is read out from the main memory location which is accessed by the physical address information supplied on the memory address line MAL and the control signal from the 1-chip CPU 101. The data read out from the main memory is output to the C-BUS 103 on the memory data line MDL 126 through the gate circuits G5 and G4 in the memory data transfer cycle following the read cycle of a microinstruction, and is received by this 1-chip CPU 101. When the received data is an instruction word, it is stored in the IB0 to IB3 203. When it is operand data, it is stored in the MDRH register 204, the MDRL register and so on.

An external setting signal EXMEND is included in the TEST 0 group of external signals stored in the CPU MODE register 225. This EXMEND signal is an external setting signal for instructing whether or not to generate a time-out error when the MAEN signal, indicating completion of an access, is not returned from the main memory within a certain period of time after access of the main memory is started by the 1-chip CPU 101. It is, in other words, a selection signal for selecting whether or not to make the time-out function effective. When the EXEMEND signal is a logic "0" a time-out error is generated when the MAEN signal is not returned within 10 $\mu$s. When the EXEMEND signal is a logic "1", return of the MAEN signal is awaited and time-out does not occur.

When the EXEMEND signal is a logic "0" and included in the TEST O group of external signals stored in the MODE register 225 of the 1-chip CPU 101, the 1-chip CPU 101 effects a time-out function during a main memory access so that running of the microprogram can proceed. Thus, a time-out error is generated only when the MAEN signal is not returned from the main memory within a predetermined period of time (10 $\mu$s) after access of the main memory is started, and thereafter the next microinstruction is processed. Control of the main memory by the CPU is effective when the EXMEND signal is a logic "0". When the 1-chip CPU 101 accesses the main memory, it outputs the BBSY signal as a memory access request. In response to this BBSY signal, access of the main memory is started and the main memory returns the SYN signal to the 1-chip CPU 101. Taking a reading operation as an example, the main memory then outputs the data stored in the addressed memory locations on the memory data line MDL of the memory bus. Thereafter, the main memory outputs the MAEN signal to instruct the 1-chip CPU 101 that the memory access has been completed, and tht data has been read out onto the memory data line MDL. When the MAEN signal is received within a predetermined time (10 $\mu$s), the 1-chip CPU 101 fetches the data read out onto the memory data line MDL, through the gate circuit G7, the C-BUS 103, the gate circuit G4, and the C-BUS 103, and stores the 16 higher order bits in the MDRH register 204 and the 16 lower order bits in the MDL register 205. Thereafter, the 1-chip CPU 103 stops outputting the BBSY signal (i.e., the BBSY signal goes to logic "0" and stops outputting memory address information. The main memory also stops outputting the MAEN signal. A memory access control operation has thus been described. During a memory access when the EXMEND signal is a logic "0" of data stored in the main memory and hence the MAEN signal is not output within a predetermined period of time (10μs) after the main memory has received the BBSY signal due to some malfunction at the main memory, side of the gate circuit G4 the 1-chip CPU 101 determines that there has been a main memory malfunction and generates an internal time-out error and continues to the next microstep.

When the EXMEND signal is a logic "1" and included in TEST O group of external signals stored in the MODE register 226 of the 1-chip CPU 101, the 1-chip CPU 101 effects the time-out functin for a main memory access in a subsequent microprogram control step. Thus, the 1-chip CPU 101 does not generate a time-out error, even after the predetermined period of time (10 μs) has elapsed after access of the main memory was started and waits until the MAEN signal is returned from the main memory. The time-out function during a memory access may be easily cancelled by setting the TEST O EXMEND signal at logic "1" in advance. Accordingly, a functional construction for a particular purpose may be easily set, for example, when a time-out is not desired until after the user has taken some measure, when MAEN signal need not be returned until after the experation of the predetermined limit time (10 μs) (e.g., when a shared main memory is being accessed by multiprocessor), or when low speed memory elements are used. As described above, the signal (EXMEND) for designating the effective/non-effective status of the time-out function is received by the 1-chip CPU 101 without requiring a separate CPU pin of this purpose thus, the limited number of CPU external connection pins may be effectively used.

During the tranfer of the I/O data, 16 bit I/O-BUS 107 is connected to the 16 lower 16 order bits of the C-BUS 013 thorugh gate circuit G7, and device addresses, commands, input/output data (I/O data) and so on are selectively transferred. The transfer of various data between the 1-chip CPU 101 and the respective I/O devices on the C-BUS 103 and the I/O-BUS 107 is started when on interruption request from the I/O device is received by the 1-chip CPU 101 and a return signal is output by the 1-chip CPU 101 to the I/O device. The interrupt request from the I/O device is input to the external TEST 1 signal group as an ATN signal. The ATN signal is input to the 1-chip CPU 101 on the C-BUS 103 together with a microinstruction to identify the signal to the 1-chip CPU 101, as has been described. The return signal from the 1-chip CPU 101 responding to this interrupt request is output to the I/O device as an ACK signal from the addressable latch circuit 1042. The ATN signal from the I/O device which indicates an interruption request from the I/O device, is supplied to a predetermined pin (ATN) of the 12 bit TEST 1 line on the I/O contorl line L7 (FIG. 3). This ATN signal is input to the 1-chip CPU 101 under control of the input timing of the microinstuction together with the other TEST 1 external signals of TEST 1, and is stored in the XSGN register 224. Then, the 1-chip CPU 101 recognizes the interrupt request from the I/O device. After the 1-chip CPU 101 receives the interrupt request and identifies the device involved, it outputs to the I/O device the ACK signal indicating that it has accepted the interupt by the externally-connected addressable latch circuit 1042. To output a command from the 1-chip CPU 101 to the I/O device, the CMD signal is latched in the addressable latch circuit 1042 to indicate an available (e.g., logic "1") status. To output a device address from the 1-chip CPU 101 to the I/O device, a logic "1" ADRS signal is latched in the addressable latch circuit 1042. To request an I/O device to supply a status signal to the 1-chip CPU 101 a logic "1" SR signal is latched in circuit 1042. The DR signal is placed at logic "1" for requesting input data from the I/O device. A logic "1" DA signal is latched in circuit 1042 for requesting output data from the 1-chip CPU 101. Transfer of various data between the 1-chip CPU 101 and the I/O devices is thus performed in this manner.

8/16 BIT I/O DATA TRANSFER

When data transmission widths vary among the various types of I/O devices connected to the I/O-BUS 107, that is, an information processing system is constructed with various type of I/O devices in which some I/O devices have a data transfer width of 8 bits while other I/O devices have a data transfer width of 16 bits, the 1-chip CPU 101 must be able to recognize whether data on the I/O-BUS 107 is 8 or 16 bits wide. Especially in the case of input data, the 1-chip CPU must be externally signaled as to the width of the data. The I/O performing a data transfer with the 1-chip CPU 101 on the I/O-BUS 107, before actual data transfer, outputs and I 8/16 signal for signaling its data transfer width at a predetermined time (e.g., when the interrupt request is generated). The I/O device outputs an I 8/16 signal of logic "0" when the data transfer width of the device as 8 bits, and and I 8/16 signal of logic "1 " when the data transfer width is 16 bits. This I 8/16 signal is supplied to the 1-chip CPU 101 side of gate circuit G4 on the I/O control line L1 (FIG. 3). This I 8/16 signal is temporarily latched in the flip-flop 108 in synchronization with the SYN signal, and is input to the 1-chip CPU 101 on the C-BUS 103 together with other TEST 1 external signals in the next microinstruction read cycle. Thus, the 1-chip CPU 202 is capable of determing the effective bit width of the I/O data on the I/O-BUS 107 and processing the I/O data with the correct bit width based on the I 8/16 signal.

Such a determination by the CPU of the I/O data transfer width according to the I 8/16 signal enables the 1-chip CPU 101 to process the I/O data consistently with the correct data transfer width, even when external I/O devices include those of 8-bit data transfer width and those of 16-bit data transfer width. Furthermore, since the I 8/16 signal is input to the 1-chip CPU 101 on the C-BUS 103 as one of the TEST 1 external signals, a separate pin for inputting I/O data transfer width information need not be provided on the 1-chip CPU 101. Thus, a limited number of external CPU connection pins may be effectively used.

SELECTION OF INSTRUCTION SYSTEM (FIG. 5)

A description will now be made of an arithmetic control unit which is capable of adopting any desired instruction system other than the original instruction system of the information processing system while performing decoding of the user instruction and fetching of the microinstruction at the same time without changing the logic elements inside the chip.

Figure 5:
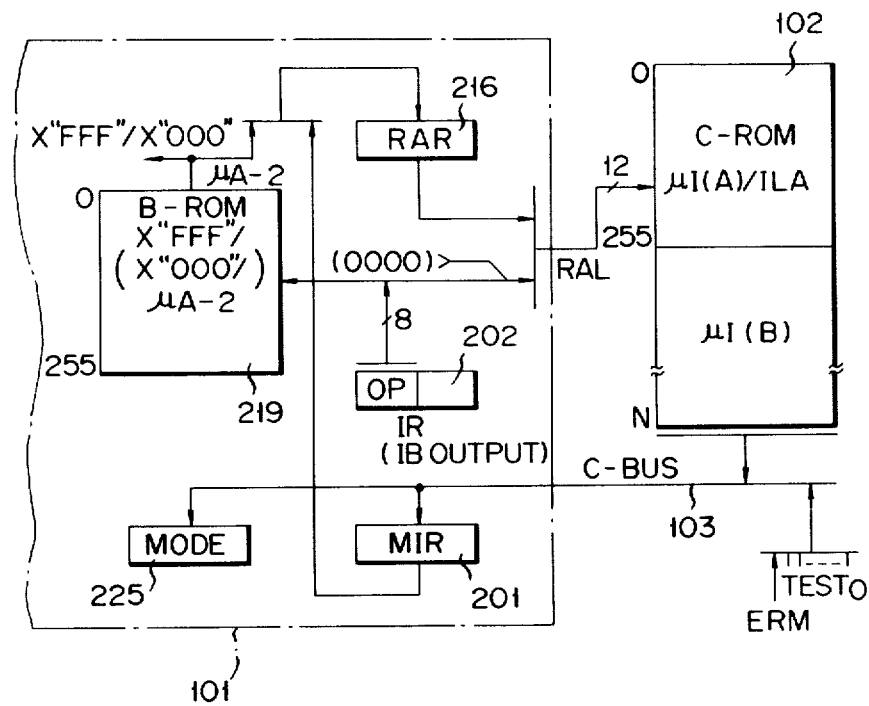
FIG. 5 is a block diagram showing the relation of an B-ROM disposed inside the one-chip arithmetic control unit, an externally-disposed control memory, and the TEST signal.

FIG. 5 is a view of some of the elements shown in FIGS. 2A and 2B, wherein the same reference numerals denote the same parts and description of which will accordingly be omitted. Information corresponding to the OP codes of instructions according to rules to be described below are stored in the addresses 0 to 25 of the B-ROM 219. When translation of an OP code can be completed with one microinstruction, a 12-bit word of all "1"s denotes (X "FFF") is stored in the B-ROM 219. When an OP code indicates an illegal instruction, a 12-bit word of all "O"s denoted (X "OOO") is stored in the B-ROM 219. When an OP code requires two microsteps or more, the microaddresses uA-2 of the C-ROM 102, which is the location of the second microinstrution step, is stored in the B-ROM 219. In the addresses (0 to 225) of the C-ROM 102 corresponding to the respective OP codes are stored the microinstructions uI(A) of the first step, starting addresses (ILA) for illegal instruction processing, or the like. In other addresses are stored the microinstruction uI(B) following the second step and the like. When the TEST O ERM signal is a logic "0", accessing of the B-ROM 219 becomes effective addresses for both the C-ROM 102 and the B-ROM 219 are designated by the OP code of the user instruction which is read out from the IBO to IB3 register 203 and stored in the IR register 202. Then, the first microinstruction is read out from the C-ROM 102, and the 12 bit identifying word (all "0"s/all "1"s/ua-2 corresponding to the OP code of the user instruction is read out from the B-ROM 219. In the case of an illegal instruction, the branch address representing the start address for illegal instruction processing is output from the C-ROM 102, and the 12 bit identifying word of all "0"s is output from the B-ROM 219, indicating that the instruction is an illegal instruction. If a 12 bit identifying word of all "0"s is output from the B-ROM 219, the information (branch address) output from the C-ROM 102 is temporarily stored in the MIR register 201 by a control operation. This information is also simultaneously stored in the RAR register 216. Thereafter, the no-operation code (all "0"s) is written in the MIR register 201, i.e., the MIR register 201 is cleared. In the case of an OP code which requires two or more microinstruction steps, the microinstruction address of the second work is output from the B-ROM 219 and is stored in the RAR register 216. When translation of an OP code may be completed with one microinstruction, a 12 bit identifying word of all "1"s is output for the B-ROM 219. When the ERM signal is a logic "1", accessing of the B-ROM 219 becomes ineffective (its output is all "0"s), the output of the C-ROM 102 is input to the RAR 216 through the MIR 201, and the no-operation code (all "0"s) is written in the MIR 201. Thus, the same operation as in the case of an illegal instruction is performed.

Operation of the C-ROM 102 and B-ROM 219 will now be described. During initialization, the TEST O group of external signals are input to the MODE register 225 of the 1-chip CPU 101 on the C-BUS 103 in a microprogram read cycle.

When the TEST O ERM signal stored in the MODE register 225 of the 1-chip CPU 101 is a logic "0" accessing of the B-ROM 219 disposed inside the 1-chip CPU 101 becomes effective, so that a processing operation may be executed with the original instruction system of the information processing system.

Addresses for both the C-ROM 102 and the B-ROM 219 are designated by the OP code of the user instruction which is read out from the IB0 to IB3 register 203 and stored in the IR register 202. Then, the first microinstruction is read out from the C-ROM 102, and the 12 bit identifying word (all "0"s/all "1"s/uA-2 corresponding to the OP code of the user instruction is output from the B-ROM 219. When the user instruction to be executed is an illegal instruction, the address designation contained in the OP code of the user instruction causes an identifying word all "0"s, indicating that the instruction is an illegal instruction, to be output from the B-ROM 219. Thus, the microinstruction read out from the C-ROM 102 (a branch address of the illegal instruction processing routine) is stored in the MIR register 201 as well as in the RAR register 216, and the contents of the MIR register 201 are rewritten as the no-operation code (all "0"s). The data stored in the C-ROM 102 is read out based on the information in the branch address stored in the RAR register 216, and enters the illegal instruction processing routine. When the OP code of the user instruction to be executed requires two or more microinstruction steps, the first microinstruction read out from the C-ROM 102 by the address designation contained in the OP code of the user instruction is stored in the MIR register 201 and executed. The C-ROM 102 is accessed by the address stored in the RAR register 216, and the second microinstruction read out from the B-ROM 219 by the address designation contained in the OP code of the user instruction is stored in the RAR register 216. Thereafter, a jump is made to the microprogram storing address for the microinstructions following the second microinstruction.

When the TEST 0 ERM signal stored in the MODE register 225 is a logic "1", is disabled the B-ROM 219 inside the 1-chip CPU 101 and processing is performed under an instruction system different from the original instruction system of the information processing system. In this case, the output of the disabled 219 is all "0"s. The information read out form the C-ROM 102 is supplied to the RAR register 216 from the MIR register 201, and the contents of the MIR register 201 are thereafter rewritten as the no-operation code (all "0"s). Thus, the processing routine becomes the same as in the case of an illegal instruction. An instruction system different from the original instruction system of the information processing system stored in the B-ROM 219 may thereby be introduced while retaining the interal logic configuration of the 1-chip PCU 101, by simply externally setting the TEST 0 ERM signal at logic "1" or "0". Since the ERM signal is input to the 1-chip CPU 101 on the C-BUS 103, an external connection pin first for the ERM signal is not necessary so that the limited number of external connection pins on the 1-chip CPU 101 may be effectively utilized.

STATUS SIGNALS (FIGS. 6-7)

Figure 6:
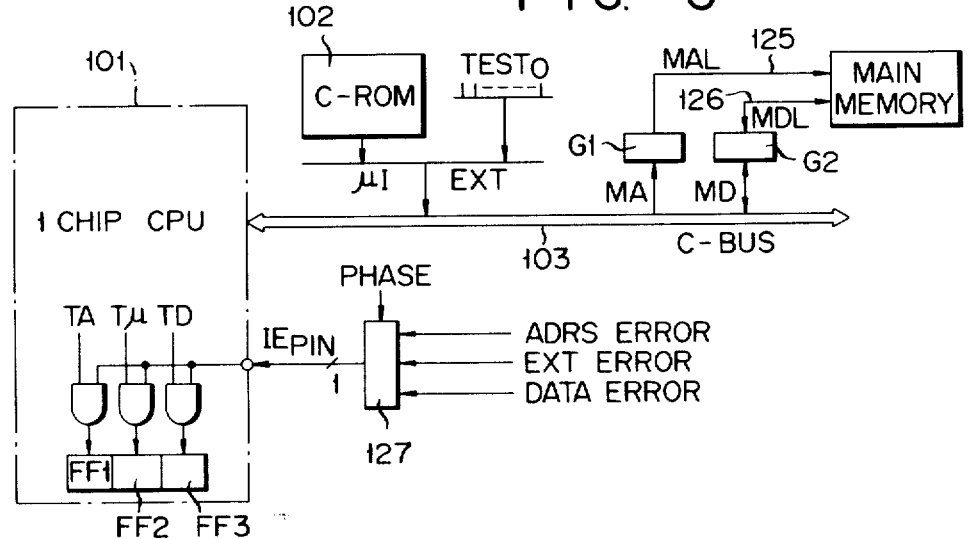
FIG. 6 is a block diagram illustrating another embodiment of the present invention.

A description will now be made with reference to FIGS. 6 and 7 of an embodiment of an information processing system in which a plurality of status signals, generated externally during multiplexed data exchange of data of different phases between the arithmetic control until and external devices on the C-BUS 103 can be received by an arithmetic control until having an extremely limited number of external connection pins. In FIG. 6 the same reference numerals denote the same parts as in FIGS. 2A and 2B, and description thereof will accordingly be omitted.

Referring to FIGS. 6 and 7, reference numeral 125 denotes a memory address line (MAL) connected to the C-BUS 103 through the gate circuit G1; and 126 denotes a memory data line (MDL) connected to the C-BUS 103 through the gate circuit G2. Reference numeral 127 denotes an external error signal reception circuit (hereinafter referred to as a decoder) for receiving a plurality of error signals generated externally of the 1-chip CPU 101, that is, address error signals (ADRS Error), external error signals (EXT Error), memory data error signals (DATA Error) and so on, and for outputting these error signals with phase signals (PHASE) in synchronism with internal data transfer cycles (TA, Tu, TD). The output of the decoder 127 is input to the 1-chip CPU on a single pin (referred to as the IE pin hereinafter). Flip-flops FF1, FF2 and FF3 are incorporated in the 1-chip CPU 101 for separately latching various error signals input to the 1-chip CPU 101 on the IE pin in synchronism with the internal data transfer signals TA, Tu and TD.

FIGS. 7A through 7D show timing for the transfer of data on the C-BUS 103, wherein FIG. 7A shows the basic clock pulse, FIG. 7B shows the transfer cycle (TA) of the memory address MA, FIG. 7C shows the transfer cycle (Tu) of the microinstruction uI; FIG. 7D shows the transfer cycle (TD) of the memory data MD; FIG. 7E shows the main memory cycle and FIG. 7F shows the microinstruction cycle.

Operation of the FIG. 6 embodiment will now be described. On C-BUS 103 are multiplexed with timing as shown in FIGS. 7A through 7D, the microinstruction uI, the memory address MA, the memory data MD and so on. Various data is exchanged between the 1-chip CPU 101 and the external devices in this manner. During such data exchanges various error signals (ADRS Error, EXT Error, DATA Error, and so on) generated externally of the 1-chip CPU 101 are supplied to the associated input pin of the decoder 127. The decoder 127 receives the various input error signals in synchronism with the phase signals (PHASE), and outputs error signals to the 1-chip CPU. The error signals output from the decoder 127 are input to the 1-chip CPU 101 on the IE pin. The respective output signals, that is, the error signals, received by the 1-chip CPU 101 are latched by the corresponding flip-flops FF1, FF2 and FF3 in synchronism with the internal signals TA, Tu, and TD. Thus, the 1-chip CPU 101 can recognize error status generated externally from the status of the flip-flops FF1, FF2 and FF3, and executes corresponding error processing.

In accordance with the construction described above three kinds of external error signals (ADRS Error, EXT Error, DATA Error) may be input to the 1-chip CPU 101 on a single pin (IE pin) and latched in the PCU and the 1-chip CPU 101 may differentiate between these three different error signals. Since the error signal concerning memory access is input through a single IE pin, error information of the DMA memory cycle generated independently of the 1-chip CPU 101 microprogram may be freely received by the 1-chip CPU 101 independently of a microinstruction.

We claim:

1. An information processing system comprising:
an arithmetic control unit fabricated on one chip:
a control memory external to said arithmetic control unit in which can be stored a plurality of microprograms each comprising a plurality of microinstructions for controlling said arithmetic control unit:
a memory bus external to said arithmetic control unit adapted to be coupled to a main memory external to said arithmetic control unit;
an input/output bus external to said arithmetic control unit adapted to be coupled to at least one input/output device;
a common bus coupled to said arithmetic control unit, said control memory, said memory bus and said input/output bus for transferring information between the arithmetic control unit and the control memory, between the arithmetic control unit and the memory bus and between the arithmetic control unit and the input/output bus;
first means for separating said common bus exteriorly of said arithmetic control unit into a first bus portion to which are coupled said arithmetic control unit and said control memory and a second bus portion to which are coupled said memory bus and said input/output bus;
said arithmetic control unit including means coupled to said first means for causing said first means to selectively either couple said first and second bus portions or to separate said common bus into said first and second bus portions, said means of said arithmetic control unit causing said first means to separate said common bus into said first and second bus portions when microinstructions are to be read from said control memory to said arithmetic control unit, said arithmetic control unit being coupled to said control memory and supplying microinstruction addresses thereto in response to which microinstructions are read out of said control memory onto said first bus portion of said common bus when said first means is caused to separate said common bus into said first and second bus portions.

2. A system according to claim 1 including second means for selectively coupling said control memory and said first bus portion, said arithmetic control unit including means coupled to said second means for causing it to couple said control memory and said first bus portion when said first means is caused to separate said first and second bus portions by said means of said arithmetic control unit when a microinstruction is read out of said control memory.

3. A system according to claim 1 wherein said common bus has a data width of N bits and said control memory includes means responsive to said microinstruction addresses for outputting microinstructions M bits wide to said first bus portion of said common bus, where M<N.

4. A system according to claim 3 including third means for selectively coupling an external signal K bits wide to said first bus portion of said common bus, where N=M+K, said arithmetic control unit including means coupled to said third means for causing it to selectively couple said external signal to said first bus portion.

5. A system according to claim 4 wherein said arithmetic control unit includes means for supplying a signal to said third means in response to which said third means couples said external signal to said first bus portion when a microinstruction is being read to said first bus portion from said control memory so that said external signal and said microinstruction are simultaneously input to said arithmetic control unit on said first bus portion.

6. A system according to claim 5 wherein said third means is comprised of means for selectively coupling a first external signal K bits wide to said first bus portion and means for selectively coupling a second external signal K bits wide to said first bus portion, said arithmetic control unit including means coupled to each of said first and second external signal coupling means for selectively supplying a signal to at least one of said first and second external signal coupling means in response to which the external signal coupling means receiving said signal couples a respective external signal to said first bus portion so that the respective external signal and a microinstruction are simultaneously input to said arithmetic control unit on said first bus portion.

7. A system according to claim 6 wherein said means of said arithmetic control unit coupled to said first and second external signal coupling means supplies said signal to cause said first external signal coupling means to be coupled to said first bus portion only during an initialization of said information processing system.

8. A system according to claim 1 wherein said input/output bus has a data width of 2L bits and is adapted to be coupled to an input/output device capable of transferring data L bits wide and to another input/output device capable of transferring data 2L bits wide.

9. A system according to claim 8 wherein said common bus has a data width of N bits and said control memory includes means responsive to said microinstruction addresses for outputting microinstructions M bits wide to said first bus portion of said common bus, where $m<N$, and including third means for selectively coupling an external signal K bits wide to said first bus portion of said common bus, where $N=M+K$, said arithmetic control unit including means coupled to said third means for causing it to selectively couple said external signal to said first bus portion at the same time that a microinstruction is read from said control memory to said first bus portion, and means for selecting the bit width of said input/output bus, said selecting means being coupled to said third means to supply thereto an input/output bus width signal as part of said external signal.

10. A system according to claim 1 including a main memory coupled to said memory bus and means for operating said main memory synchronously with said arithmetic control unit.

11. A system according to claim 10 including means for selectively coupling said memory bus and said second bus portion of said common bus when said first and second bus portions of said common bus are caused to be coupled by said means of said arithmetic control unit when said main memory is accessed by said arithmetic control unit, and further means for coupling said main memory to said arithmetic control unit for supplying a signal to said arithmetic control unit which indicates completion of a main memory access by said arithmetic control unit, said arithmetic control unit commencing a next operation only upon receipt of said access completion indicating signal.

12. A system according to claim 10 including means for selectively coupling said memory bus and said second bus portion of said common bus when said first and second bus portions of said common bus are caused to be coupled by said means of said arithmetic control unit when said main memory is accessed by said arithmetic control unit, and further means for coupling said main memory to said arithmetic control unit for supplying a signal to said arithmetic control unit which indicates completion of a main memory access by said arithmetic control unit, said arithmetic control unit determining whether said access completion indicating signal is output by said main memory within a predetermined time after access of said main memory is commenced and causing said information processing system to generate an error signal if said access completion indicating signal is not output within said predetermined time and to continue processing.

13. A system according to claim 10 wherein said common bus has a data width of N bits and said control memory includes means responsive to said microinstruction addresses for outputting microinstructions M bits wide to said first bus portion of said common bus, where $M<N$, said system including means for selectively coupling said memory bus and said second bus portion of said common bus when said first and second bus portions of said common bus are caused to be coupled by said means of said arithmetic control unit when said main memory is accessed by said arithmetic control unit, further means for coupling said main memory to said arithmetic control unit for supplying a signal to said arithmetic control unit which indicates completion of a main memory access by said arithmetic control unit, and third means coupled to said common bus for selectively coupling an external signal K bits wide to said first portion of said common bus, where $N=M+K$, said arithmetic control unit including means coupled to said third means for selectively causing it to couple said external signal to said first bus portion at the same time that a microinstruction is read from said control memory to said first bus portion, and wherein said arithmetic control unit includes means for, in dependence on at least one bit of said external signal,
  (a) commencing a next operation only upon receipt of said access completion signal or
  (b) determining whether said access completion indicating signal is output by said main memory within a predetermined time after access of said main memory is commenced and causing said information processing system to generate an error signal if said access completion signal is not output within said predetermined time and to continue processing.

* * * * *